(12) United States Patent
Krug et al.

(10) Patent No.: US 11,418,141 B2
(45) Date of Patent: Aug. 16, 2022

(54) HYBRID DRIVE APPARATUS

(71) Applicant: Eaton Intelligent Power Limited, Dublin (IE)

(72) Inventors: Adam Krug, Menomonee Falls, WI (US); Huaqiang Li, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/004,410

(22) Filed: Aug. 27, 2020

(65) Prior Publication Data

US 2021/0083614 A1 Mar. 18, 2021

Related U.S. Application Data

(60) Provisional application No. 62/902,210, filed on Sep. 18, 2019.

(51) Int. Cl.
*H02P 27/08* (2006.01)
*H02P 29/50* (2016.01)

(52) U.S. Cl.
CPC .............. *H02P 27/08* (2013.01); *H02P 29/50* (2016.02); *H02P 2201/03* (2013.01)

(58) Field of Classification Search
CPC .......... H02P 27/06; H02P 27/04; H02P 21/00; H02P 27/00; H02P 27/08; H02P 1/00; H02P 1/04; H02P 1/16; H02P 1/24; H02P 1/26; H02P 1/42; H02P 1/46; H02P 1/54; H02P 3/00; H02P 6/12; H02P 6/00; H02P 6/15; H02P 7/29; H02P 21/22; H02P 9/00; H02P 1/465; H02P 7/292; H02P 23/07; H02P 13/00; H02P 2201/07; H02P 2209/00; G05B 11/28
See application file for complete search history.

(56) References Cited

U.S. PATENT DOCUMENTS

| 8,755,205 B2 * | 6/2014 | Azuma | H02P 27/06 363/37 |
| 9,042,146 B2 | 5/2015 | Weiss et al. | |
| 9,595,881 B2 * | 3/2017 | Ichihara | H02M 1/126 |
| 10,191,531 B2 | 1/2019 | Zhang et al. | |

(Continued)

OTHER PUBLICATIONS

"Are Bearing Currents Causing Your Motor Failures?" Product Application Guide Fan Application FA/117-03, Greenheck Fan Corp. (2011).

(Continued)

*Primary Examiner* — Antony M Paul
(74) *Attorney, Agent, or Firm* — DiBerardino McGovern IP Group LLC

(57) ABSTRACT

A motor driver apparatus includes: a converter including a first electrical network configured to convert AC electrical power into DC electrical power, the first electrical network including at least one electronic element that includes a wide bandgap semiconductor material; and an inverter electrically connected to the converter, the inverter including a second electrical network configured to generate an AC motor power signal from the DC electrical power, the second electrical network includes a plurality of electronic elements that include a semiconductor material that is not a wide bandgap semiconductor material.

22 Claims, 10 Drawing Sheets

(56) References Cited

U.S. PATENT DOCUMENTS

| | | | |
|---|---|---|---|
| 10,523,130 B2* | 12/2019 | Bax | H02M 7/487 |
| 11,114,970 B2* | 9/2021 | Hatakeyama | H02P 27/085 |
| 2020/0358365 A1* | 11/2020 | Yuasa | H02M 5/4585 |

OTHER PUBLICATIONS

Collins, "What are the benefits of an active front end (AFE) drive?" Motion Control Tips: A Design World Resource, available at https://www.motioncontroltips.com/what-are-the-benefits-of-an-active-front-end-afe-drive/, last visited Aug. 25, 2020 (Aug. 8, 2018).

Collins, "What are VFD reflected waves and why are they harmful?" Motion Control Tips: A Design World Resource, available at https://www.motioncontroltips.com/faq-what-are-vfd-reflected-waves-and-why-are-they-harmful/, last visited Aug. 27, 2020 (Sep. 2, 2016).

Dai et al., "Comparative investigation of PWM current-source inverters for future machine drives using high-frequency wide-bandgap power switches," 2018 IEEE Applied Power Electronics Conference and Exposition (APEC), San Antonio, TX (2018), doi: 10.1109/APEC.2018.8341384.

Kahlane et al., "LCL filter design for photovoltaic grid connected systems," Revue des Energies Renouvelables SIENR'14 Ghardaïa, pp. 227-232 (2014).

Mao et al., "Three-phase active front-end rectifier efficiency improvement with silicon carbide power semiconductor devices," 2016 IEEE Energy Conversion Congress and Exposition (ECCE), Milwaukee, WI (2016).

Prasad et al., "Vector control of three-phase AC/DC front-end converter," Sādhanā, vol. 33, Part 5, pp. 591-613 (2008).

Reznik et al., "LCL Filter Design and Performance Analysis for Grid Interconnected Systems," IEEE Transactions on ndustry Applications, vol. 50, No. 2, pp. 1225-1232 (2014), doi: 10.1109/TIA.2013.2274612.

Soeiro et al., "Comparison of 2- and 3-level Active Filters with Enhanced Bridge-Leg Loss Distribution," 8th In'l Conference on Power Electronics—ECCE Asia, Jeju, South Korea (2011), doi: 10.1109/ICPE.2011.5944519.

Vacca, "Benefits and advantage of silicon carbide power devices over their silicon counterparts," Compounds & Adv. Silicon, vol. 12, Issue 3, pp. 72-75 (2017).

VFD: Active Front End, Tech Articles, EMA, Inc., available at www.emainc.net/2015/10/19/vfd-active-front-end, last visited Aug. 25, 2020 (2015).

* cited by examiner

HYBRID DRIVE APPARATUS

CROSS-REFERENCE TO RELATED APPLICATION

This application claims the benefit of U.S. Provisional Application No. 62/902,210, filed on Sep. 18, 2019 and titled HYBRID DRIVE APPARATUS, which is incorporated herein by reference in its entirety.

TECHNICAL FIELD

This disclosure relates to a hybrid drive apparatus.

BACKGROUND

An electrical apparatus, such as a variable speed drive, variable frequency drive, or an adjustable speed drive, may be connected to an alternating current (AC) high-power electrical distribution system, such as a power grid. The electrical apparatus drives, powers, and/or controls a machine, or a non-machine type of load. The electrical apparatus includes converter that converts AC power to direct-current (DC) power and an inverter that converts DC power to AC power that is provided to the load.

SUMMARY

In one aspect, a motor driver apparatus includes: a converter including a first electrical network configured to convert AC electrical power into DC electrical power, the first electrical network including at least one electronic element that includes a wide bandgap semiconductor material; and an inverter electrically connected to the converter, the inverter including a second electrical network configured to generate an AC motor power signal from the DC electrical power, the second electrical network includes a plurality of electronic elements that include a semiconductor material that is not a wide bandgap semiconductor material.

Implementations may include one or more of the following features. The first electrical network may include a plurality of electronic elements that include a wide bandgap semiconductor material. The motor driver apparatus also may include a control system configured to control a state of each electronic element in the first electrical network. The control system also may be configured to control the electronic elements in the second electrical network. The control system may be configured to control the electronic elements in the second electrical network to implement pulse width modulation of the DC electrical power. The motor driver apparatus also may include a filter system electrically connected to the converter. The filter system may receive AC electrical power and provide filtered AC electrical power to the converter such that the converter is configured to convert the filtered AC electrical power to the DC electrical power.

The motor driver apparatus also may include a bus electrically connected to the converter and the inverter, and the bus may include at least one capacitive element.

The first electrical network may be configured as an M-level converter, and the second electrical network may be configured as an N-level converter, where each of M and N is an integer value of two or greater. In some implementations, M and N are the same integer value. In some implementations, M and N are not the same integer value.

The wide bandgap semiconductor material may include silicon carbide (SiC) or gallium nitride (GaN), and the semiconductor material that is not a wide bandgap semiconductor material may be silicon (Si) or gallium arsenide (GaAs).

The semiconductor material that is not a wide bandgap semiconductor material may be any semiconductor material that has a bandgap of about 1-1.5 electronvolts (eV) at 300 Kelvin (K), and the wide bandgap semiconductor material may be any semiconductor material that has a bandgap of about 2-4 eV at 300 K.

Each of the electronic elements in the first electrical network may be a transistor, and each of the electronic elements in the second electrical network may be a transistor.

In another aspect, an apparatus for a motor driver is configured to provide direct current (DC) electrical power to one or more inverters, the apparatus including: a converter including a first electrical network configured to generate DC electrical power from AC electrical power, the first electrical network including a plurality of electronic elements that include a wide bandgap semiconductor material; and a DC link electrically connected to the converter, the DC link configured to store DC electrical power from the converter and to provide DC electrical power to the one or more inverters. Each of the one or more inverters includes a second electrical network configured to generate an alternating current (AC) motor power signal, and each of the second electrical networks include electronic elements that are made of a semiconductor material that is not a wide bandgap semiconductor material.

Implementations may include one or more of the following features. The apparatus also may include a filter system electrically connected to the converter, and the converter may be between the filter system and the DC link.

In another aspect, a system includes: a motor driver apparatus including: a converter including a first electrical network, the first electrical network including at least one electronic element made of a wide bandgap semiconductor material; a bus electrically connected to the converter; and an inverter electrically connected to the bus, the inverter including a second electrical network configured to generate an alternating current (AC) motor power signal, the second electrical network includes electronic elements that are made of a semiconductor material that is not a wide bandgap semiconductor material; and a motor configured to receive the AC motor power signal, where one or more of a speed, torque and direction of a rotor of the motor is determined by the AC motor power signal.

Implementations may include one or more of the following features. The system may include a housing that encloses the motor driver apparatus. The system may include a filter system electrically connected to the converter.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
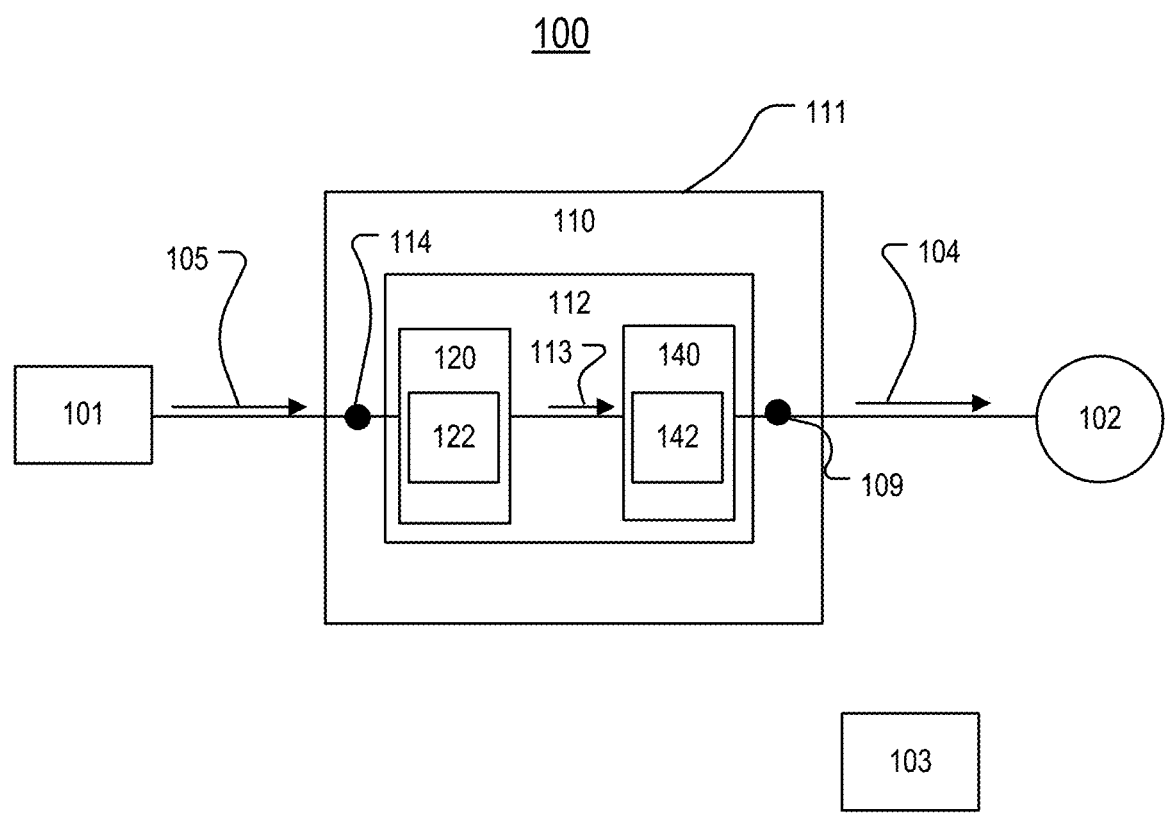
FIG. 1 is a block diagram of a system that includes an electrical apparatus.

Referring to FIG. 1, a block diagram of a system 100 is shown. The system 100 includes an electrical apparatus 110 that is electrically connected to an alternating current (AC) electrical power distribution network 101 and a load 102. As discussed in greater detail below, the electrical apparatus 110 is a hybrid drive apparatus that includes a converter 120 implemented with electronic components made of a wide bandgap (WBG) semiconductor material and an inverter 140 implemented with electronic components made of a conventional semiconductor material. This hybrid configuration results in greater efficiency, smaller size, reduced weight, and/or reduced cost. Moreover, the hybrid configuration is well suited for use with existing loads (for example, motors) in industrial control applications and does not require that the loads be redesigned or modified.

The load 102 may be, for example, an induction machine, an induction motor, or a synchronous permanent magnet machine that operates at a speed and torque that is determined by an AC motor power signal 104. The electrical apparatus 110 generates the AC motor power signal 104. The electrical apparatus 110 and the load 102 are used in an industrial process 103. The industrial process 103 may be, for example, a conveying process; a heating, ventilation, and air conditioning (HVAC) process; a natural gas or oil refining process; a mining process; or a pumping process.

The electrical power distribution network 101 may be, for example, a multi-phase electrical power grid that provides electricity to industrial, commercial and/or residential customers. The AC electrical power distribution network 101 distributes AC electrical power that has a fundamental frequency of, for example, 50 or 60 Hertz (Hz). The distribution network 101 may have an operating three-phase line-to-line voltage of, for example, up to 690 volt (V) root mean square (RMS) for low voltage, and above 690V such as 10 kV for medium or high voltage. The network 101 may include, for example, one or more transmission lines, distribution lines, power distribution or substation transformers, electrical cables, and/or any other mechanism for transmitting electricity.

The electrical apparatus 110 includes an electrical network 112 that receives AC electrical power 105 from the distribution network 101 at an input node 114. The electrical apparatus 110 is enclosed in a housing or enclosure 111. The housing 111 is a three-dimensional body made of a solid and rugged material that protects the electrical network 112. The input node 114 is accessible from an exterior of the housing 111 such that the electrical apparatus 110 may be connected to the distribution network 101. The electrical apparatus 110 also includes an output port 109 that is accessible from the exterior of the housing 111. The load 102 connects to the electrical apparatus 110 at the output port 109.

The electrical network 112 generates the AC motor power signal 104 for the load 102 based on the AC electrical power 105 from the distribution network 101. The electrical network 112 includes the converter 120 and the inverter 140. The converter 120 includes an electrical network 122 configured to convert the AC electrical power 105 into direct current (DC) electrical power 113. The converter 120 may be, for example, an active front end (AFE) or pulse width modulation (PWM) rectifier. The inverter 140 includes an electrical network 142 configured to convert the DC electrical power 113 into the AC motor power signal 104. The electrical apparatus 110 may be, for example, a variable speed drive (VSD), an adjustable speed drive (ASD), or a variable frequency drive.

The electrical network 122 includes at least one electronic component (for example, a transistor) that is made of a wide bandgap (WBG) semiconductor material. The electrical network 142 includes a plurality of electrical components, each of which is made of a conventional semiconductor material. A WBG compound semiconductor material is a material that has a relatively large bandgap as compared to a conventional semiconductor material. The bandgap is the energy difference between the top of the valence band and the bottom of the conduction band in a solid material. A conventional semiconductor material has a bandgap of, for example, 1-1.5 electronvolt (eV) at 300 Kelvin (K). Silicon (Si), which has a bandgap of 1.1 eV, is an example of a conventional semiconductor material. Gallium arsenide (GaAs), which has a bandgap of 1.43 eV at 300 K, is another example of a conventional semiconductor material. Yet another example of a conventional semiconductor is indium phosphide (InP), which has a bandgap of 1.27 at 300 K. On the other hand, a wide bandgap semiconductor material has a larger bandgap, for example, a bandgap of 2-4 eV. Silicon carbide (SiC), which has a bandgap of about 3.2 eV, and gallium nitride (GaN), which has a bandgap of about 3.4 eV, are examples of WBG semiconductor materials.

The electrical apparatus 110 employs a hybrid approach that uses electronic components made of a WBG semiconductor material in the electrical network 122 and electronic components made of a conventional semiconductor material in the electrical network 142. This hybrid approach results in the electrical apparatus 110 being more compact and more efficient, lighter weight, and less expensive, as discussed below.

Figure 2:
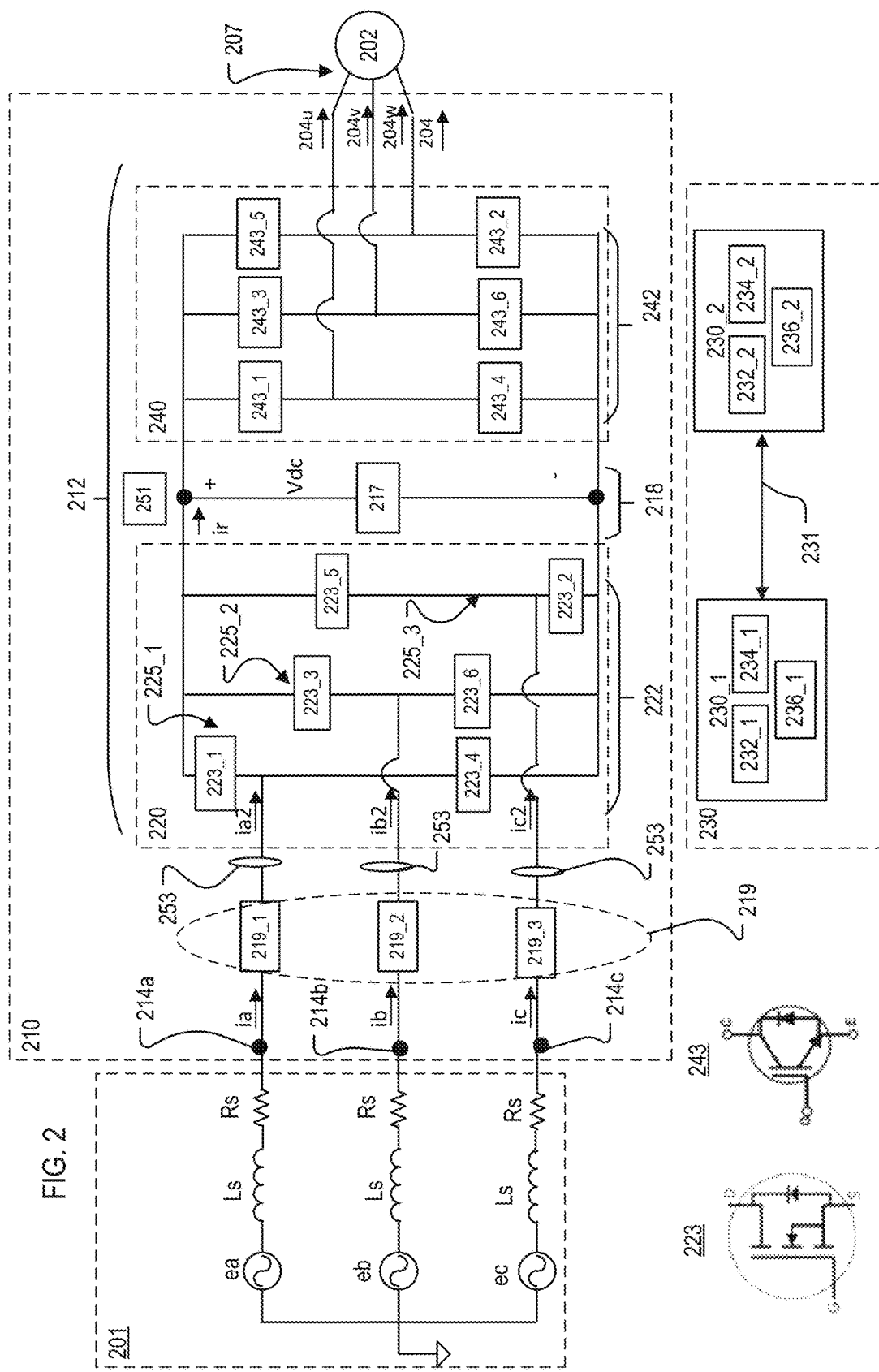
FIG. 2 is a block diagram of another system that includes an electrical apparatus.

FIG. 2 is a schematic of a system 200. The dashed lines in FIG. 2 are used to show groupings of elements, and the dashed lines do not necessarily represent physical objects. However, the electrical apparatus 210 may include an enclosure similar to the housing 111 (FIG. 1).

The system 200 includes an electrical apparatus 210 that is connected to a three-phase AC electrical power distribution network 201 and a motor 202. The motor 202 may be, for example, an induction motor or a permanent magnet synchronous machine. The electrical apparatus 210 receives three-phase electrical power from the distribution network 201 and provides a three-phase motor power signal 204 to the motor 202.

The electrical power distribution network 201 distributes AC electrical power that has a fundamental frequency of, for example, 50 or 60 Hertz (Hz). The distribution network 201 may have an operating voltage of up to 690V. The distribution network 201 may include, for example, one or more transmission lines, distribution lines, electrical cables, and/or any other mechanism for transmitting electricity. The distribution network 201 includes three phases, which are referred to as a, b, and c. Each phase has a respective voltage ea, eb, ec. The impedance of the distribution network 201 is represented by an inductor Ls in series with a resistance Rs. The impedance of the distribution network 201 depends on the impedance characteristics of the components included in the distribution network 201.

The electrical apparatus 210 includes input nodes 214a, 214b, 214c, each of which is electrically coupled to one of the three phases of the distribution network 201. In the example of FIG. 2, the input node 214a is electrically connected to the a phase, the input node 214b is electrically connected to the b phase, and the input node 214c is electrically connected to the c phase. The electricity provided by the distribution network 201 is nominally sinusoidal and includes only a single frequency component at the fundamental frequency.

The electrical apparatus 210 includes an electrical network 212. The electrical network 212 includes a converter 220, a bus 218, and an inverter 240. In the example of FIG. 2, the converter 220 is an AFE or PWM rectifier. The converter 220 includes an electrical network 222, which includes modules 225_1, 225_2, and 225_3. The module 225_1 is electrically connected to the input node 214a, the module 225_2 is electrically connected to the input node 214b, and the module 225_3 is electrically connected to the input node 214c.

In the implementation shown in FIG. 2, each of the modules 225_1, 225_2, and 225_3 includes two controllable electronic components that are made of a WBG semiconductor material. The module 225_1 includes electronic components 223_1 and 223_4. The module 225_2 includes electronic components 223_3 and 223_6. The module 225_3 includes electronic components 223_5 and 223_2.

The electronic components 223_1 to 223_6 may be arranged in any configuration that enables the converter 220 to convert the AC electrical power from the distribution network 201 into DC electrical power. In the example of FIG. 2, the electronic components 223_1 to 223_6 are arranged to form a rectifier. The converter 220 shown in FIG. 2 is a two-level converter, meaning that the converter 220 produces two levels of output voltage for each phase. Other configurations are possible. For example, the modules 225_1, 225_2, and 225_3 may be configured such that the converter 220 is a three-level converter that is able to produce three levels of output voltage for each phase. In these implementations, each of the modules 225_1, 225_2, and 225_3 may include four transistors made of a WBG semiconductor material. Still other configurations are possible. The converter 220 may be an M-level converter, where M is an integer number of 2 or greater such that M levels of output voltage are produced for each phase. The input voltages may be expanded to medium or high voltage above 690V, with the corresponding motor loads at such a corresponding voltage level.

Each of the electronic components 223_1 to 223_6 is any type of electronic component that has at least two stable states: a first state in which current is able to flow in the electronic component and a second state in which current cannot flow in the electronic component, and each of the electronic components 223_1 to 223_6 is controllable such that the electronic component may be reliably placed in a particular state. For example, each of the controllable electronic components 223_1 to 223_6 may be an insulated gate bipolar transistor (IGBT), a junction field-effect transistor (JFET), a bipolar junction transistor (BJT), a metal oxide semiconductor transistor (MOSFET), or a thyristor. Each of the electronic components 223_1 to 223_6 may be, for example, SiC or GaN transistor.

In the example of FIG. 2, the state of the electronic components 223_1 to 223_6 is controlled by a control system 230_1. By controlling the state of each of the electronic components 223_1 to 223_6, the converter 220 rectifies input currents ia2, ib2, ic2 into a rectified current ir. For example, in implementations in which the electronic components 223_1 to 223_6 are transistors, the gate of each transistor is configured to receive a gate signal from the control system 230_1 (or from a voltage source controlled by the control system 230_1) that determines the state of that transistor. A diagram of a SiC MOSFET that may be used for each of the electronic components 223_1 is labeled 223 in FIG. 2. The MOSFET 223 includes a gate (g), a drain (d), and a source (s). When the MOSFET is on, current flows from the drain (d) to the source (s). The voltage at the gate (g) controls the state of the MOSFET 223. The MOSFET 223 is shown separately from the converter 220. However, when an instance of the MOSFET 223 is used as each of the electronic components 223_1 to 223_6 in the converter 220, the gate (g) of each instance of the MOSFET 223 is connected to a control system 230_1 such that the control system 230_1 controls the state of each of the electronic components 223_1 to 223_6.

The electronic components 223_1 to 223_6 are also electrically connected to the bus 218. The bus 218 includes a capacitor network 217. The capacitor network 217 includes one or more capacitors. The rectified current ir charges the capacitor or capacitors in the capacitor network 217. The capacitor or capacitors in the network 217 stores energy, E, as shown in Equation (1):

$$E = \tfrac{1}{2} * C * Vdc^2 \qquad \text{Equation (1)},$$

where C is the capacitance of the capacitor or capacitors in the network 217, and Vdc is the voltage across the bus 218.

The inverter 240 includes a network of electronic switches 243_1 to 243_6 that are each made of a conventional semiconductor material, such as, for example, Si or GaAs. The conventional semiconductor material may be any semiconductor material that is not a WBG semiconductor material. Each of the electronic switches 243_1 to 243_6 may be, for example, a power transistor that is made of Si. The electronic switches 243_1 to 243_6 are arranged such that the inverter 240 generates the motor power signal 204 from the energy that is stored in the capacitor network 217. The inverter 240 converts the energy stored in the capacitor network 217 into a three-phase AC motor power signal 204 that is provided to the motor 202. The three-phase motor power signal 204 has phase components 204u, 204v, 204w, each of which is provided to one of the three phases of the motor 202. Each phase 204u, 204v, and 204w is a train of voltage pulses that have an amplitude sufficient to operate the motor. The switching frequency of the AC motor power signal 204 may vary between, for example, 1 kHz and 20 kHz, with the upper limit of the frequency being determined by the limit of the switching speed of the electronic components 243_1 to 243_6, as well as system thermal and performance requirements.

The inverter 240 may implement, for example, a pulse width modulation (PWM) technique to modulate the energy that is stored in the capacitor network 217 into the AC motor power signal 204. The PWM technique may be implemented based on any type of control algorithm, such as, for example, a 6-step electronic commutation, various field oriented controls, a space vector PWM, or a sinusoidal PWM. The PWM technique may be implemented by the control system 230. The switching of the electronic switches 243_1 to 243_6 is controlled such that the amplitude, frequency, and phase of the motor power signal 204 is also controlled. The amplitude, frequency, and phase of the motor power signal 204 determine the operating properties of the motor 202 such that the motor power signal 204 may be used to operate the motor 202 at a particular torque, speed, and direction.

The inverter 240 shown in FIG. 2 is a two-level inverter. However, other configurations are possible. For example, the inverter 240 may be a three-level inverter, or an N-level inverter, where N is an integer number of 2 or greater. As discussed above, the converter 220 may be an M-level converter, where M is an integer number of 2 or greater. M and N may be the same value, or M and N may be different values. For example, the electrical apparatus 210 may be implemented with a 2-level converter and a 3-level inverter.

A diagram of a Si IGBT that may be used for each of the electronic components 243_1 to 243_6 is labeled 243 in FIG. 2. The IGBT 243 includes a gate (g), a collector (c), and an emitter (e). When the IGBT 243 is on, current flows from the collector (c) to the emitter (e). The voltage at the gate (g) controls the state of the IGBT 243. The IGBT 243 is shown separately from the converter 220. However, when an instance of the IGBT 243 is used as each of the electronic components 243_1 to 243_6 in the inverter 240, the gate (g) of each instance of the IGBT 243 is connected to a control system 230_2 such that the control system 230_4 controls the state of each of the electronic components 243_1 to 243_6.

In the example of FIG. 2, the motor power signal 204 is delivered to the motor 202 via an electrical cable 207. The electrical cable 207 is any type of cable that is suitable in inverter operations for carrying electricity. For example, the electrical cable 207 may include three metal (for example, copper) conductors (one for each phase) that are encased in an insulating tubing. In some implementations, the conductor for each phase is encased in a separate insulating tubing such that there are as many cables as phases. Additional ground cable or shielding may also be equipped.

The length of the cable 207 depends on the application. For example, in an industrial control application in which it is desirable to have the motor 202 relatively far from the electrical apparatus 210, the cable 207 may be tens or hundreds of meters. Examples of an industrial control application include, HVAC applications, pump applications, mining applications, just to name a few.

The system 200 includes a control system 230, which includes the control system 230_1 and a control system 230_2. The control system 230_1 is configured to control the converter 220. The control system 230_2 is configured to control the inverter 240. The control system 230_1 and the control system 230_2 communicate via a communication link 231. The communication link 231 may be any type of communication link that is configured for bi-directional communication. Any type of data may be communicated via the communication link 231. For example, the control system 230_1 and the control system 230_2 may share status information or operating parameters via the communication link 231. In the example of FIG. 2, the control systems 230_1 and 230_2 are shown as separate from the electrical apparatus 210. However, the control systems 230_1 and 230_2 may be part of the electrical apparatus 210 and may be, for example, placed in a housing with the converter 220, the bus 218, and the inverter 240.

The control system 230_1 includes an electronic processing module 232_1, an electronic storage 234_1, and an input/output (I/O) interface 236_1. The electronic processing module 232_1 includes two or more electronic processors. The electronic processors of the processing module 232_1 may be any type of electronic processor capable of controlling the WBG electronic components 223_1 to 223_6. For example, the electronic processors of the processing module 232_1 may include a general purpose central processing unit (CPU), a graphics processing unit (GPU), a microcontroller, a field-programmable gate array (FPGA), a Complex Programmable Logic Device (CPLD), and/or an application-specific integrated circuit (ASIC). In some implementations, the electronic processing module 232_1 may include a digital signal processor (DSP), a microcontroller, and an application-specific integrated circuit (ASIC) to handle the relatively complex control of the WBG semiconductor electronic components 223_1 to 223_6. Although in most implementations, the electronic processing module 232_1 includes more than one electronic processor, in some implementations, the electronic processing module 232_1 includes one electronic processor.

Figure 3A:
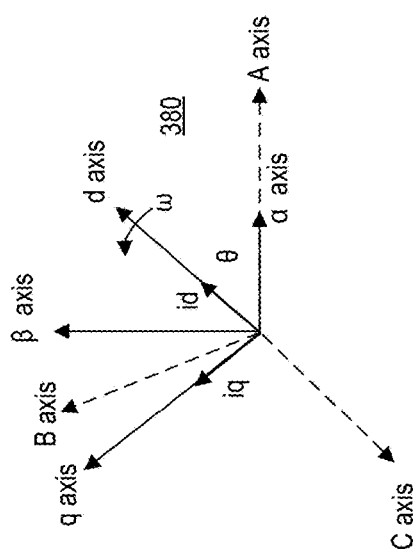
FIG. 3A is a representation of stationary and rotating coordinate systems.
Figure 3B:
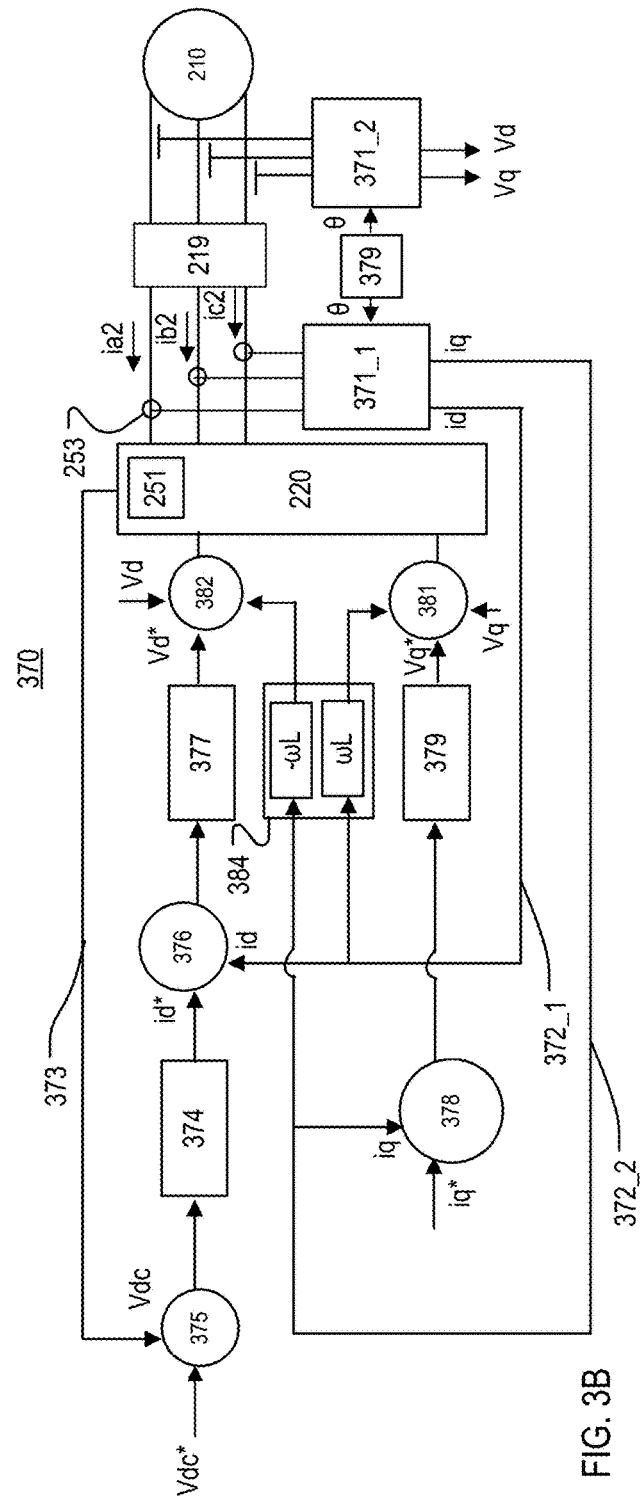
FIG. 3B is a control diagram of a vector controller for a converter.

The electronic storage 234_1 is any type of electronic memory that is capable of storing data and instructions (for example, in the form of computer programs or software), and the electronic storage 234_1 may include volatile and/or non-volatile components. The electronic storage 234_1 and the processing module 232_1 are coupled such that the processing module 232_1 is able to access or read data from and write data to the electronic storage 234_1. The electronic storage 234_1 stores instructions that, when executed, cause the electronic processing module 232_1 to analyze data, control components, and/or retrieve information. For example, the electronic storage 234_1 may store computer programs that cause the control system 230_1 to control the state of the electronic components 223_1 to 223_6 by controlling the voltage at the gate of each of the electronic components 223_1 to 223_6. In another example, the electronic storage 234_1 may store a computer program that implements all or aspects of a vector controller 370 (FIG. 3B). For example, the electronic storage 234_1 may store instructions that implement the Clarke transform, the Park transform, and various mathematical operations related to the vector controller 370. The electronic storage 234_1 also may store information about the system 200.

The control system 230_2 includes an electronic processing module 232_2, an electronic storage 234_2, and an input/output (I/O) interface 236_2. The electronic processing module 232_2 includes one or more electronic processors. The electronic processors of the processing module 232_2 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC). As compared to the processing module 232_1, the processing module 232_2 may be lower performance and less complex.

Figure 3C:
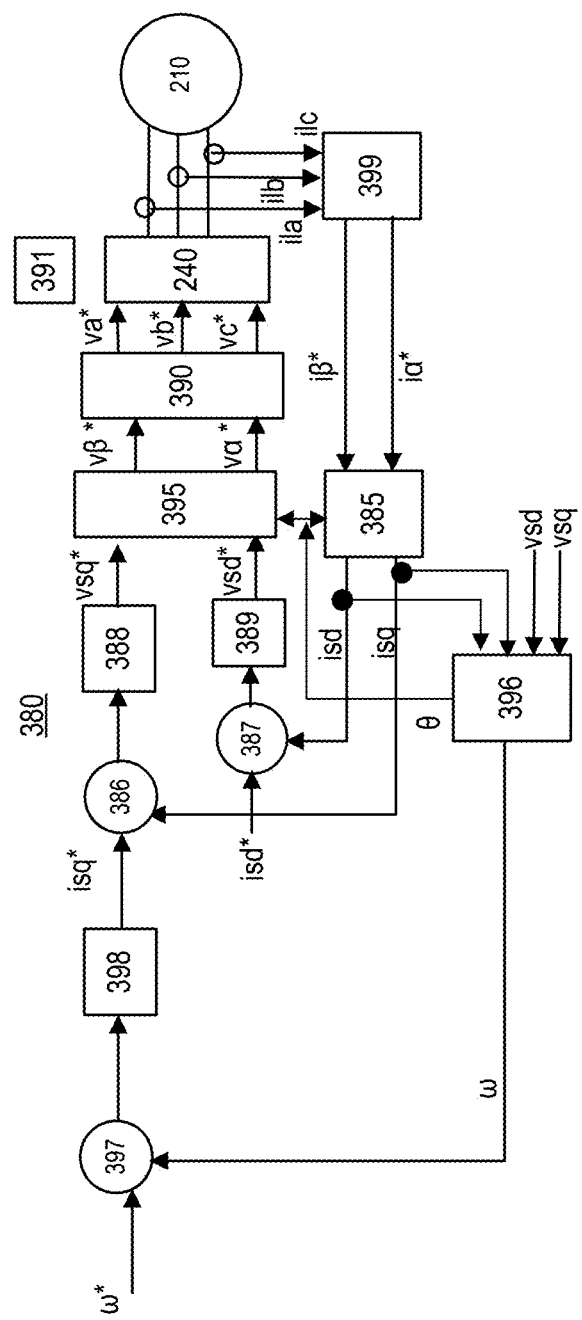
FIG. 3C is a control diagram of a vector controller for an inverter.

The electronic storage 234_2 may be any type of electronic memory that is capable of storing data and instructions in the form of computer programs or software, and the electronic storage 234_2 may include volatile and/or non-volatile components. The electronic storage 234_2 and the processing module 232_2 are coupled such that the processing module 232_2 is able to access or read data from and write data to the electronic storage 234_2. The electronic storage 234_2 stores instructions that, when executed, cause the electronic processing module 232_2 to analyze data, control components, and/or retrieve information. For example, the electronic storage 234_2 may store computer programs that govern the PWM technique implemented by the inverter 240. The electronic storage 234_2 may store a collection of instructions in the form of one or more computer programs that implement a vector controller that controls the switching action of the electronic components 243_1 to 243_6. The vector controller implemented to control the inverter 240 may be a vector controller 380 (FIG. 3C). For example, the electronic storage 234_2 may store instructions that implement the Clarke transform, the Park transform, inverses of the Clarke and Park transforms, and various mathematical operations related to a vector controller.

The I/O interfaces 236_1 and 236_2 are any interface that allows a human operator and/or an autonomous process to interact with the respective control systems 230_1 and 230_2. The I/O interfaces 236_1 and 236_2 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interfaces 236_1 and 236_2 also may allow communication without physical contact through, for example, an IEEE 802.11, Bluetooth, or a near-field communication (NFC) connection. Each of the I/O interfaces 236_1 and 236_2 may have a different configuration and the I/O interfaces 236_1 and 236_2 do not necessarily include the same components.

In some implementations, the control systems 230_1 and 230_2 are capable of being operated, configured, modified, or updated through their respective I/O interfaces 236_1 and 236_2. The I/O interfaces 236_1 and 236_2 also may allow the respective control systems 230_1 and 230_2 to communicate with components in the system 200 and with systems external to and remote from the system 200. For example, the I/O interface 236_1 may control a switch or a switching network (not shown) or a breaker within the system 200 that allows the electrical apparatus 210 to be disconnected from the distribution network 201. In another example, the I/O interface 236_2 may include a communications interface that allows communication between the control system 230_2 and a remote station (not shown), or between the control system 230_2 and a separate monitoring apparatus.

Figure 4B:
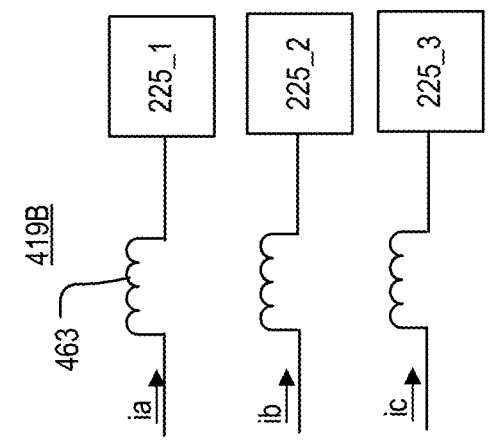
FIGS. 4A and 4B are schematics of filters.
Figure 4A:
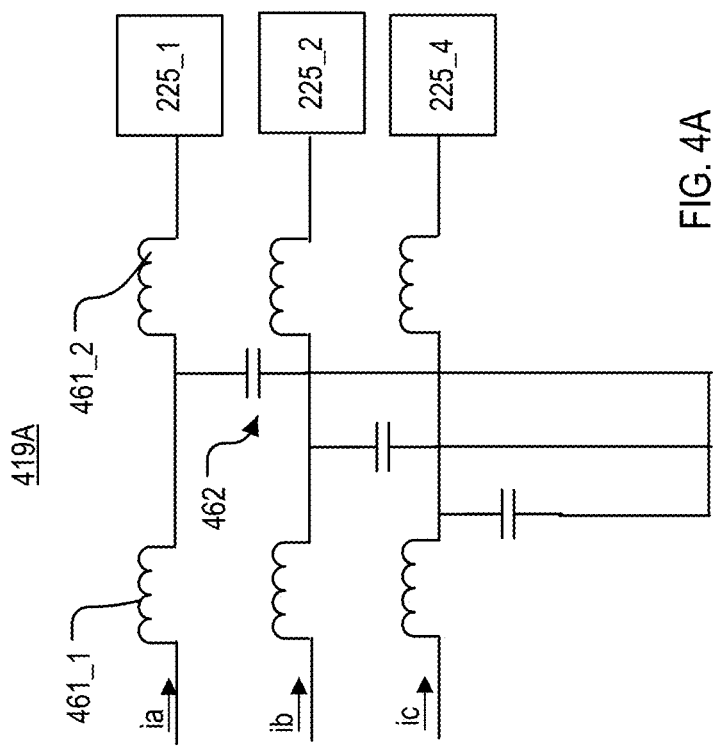

The electrical apparatus 210 also includes a filter system 219. The filter system 219 includes a filter for each phase of the converter 220 (filters 219_1, 219_2, and 219_3 in the example of FIG. 2). The filter system 219_1 is electrically connected between the module 225_1 and the input node 214$a$, the filter system 219_2 is electrically connected between the module 225_2 and the input node 214$b$, and filter 219_3 is electrically connected between the module 225_3 and the input node 214$c$. FIGS. 4A and 4B show implementations of the filter system 219. An overview of the filter system 219 is discussed before discussing the implementations shown in FIGS. 4A and 4B.

The WBG semiconductor electronic components 223_1 to 223_6 are capable of switching between the first state and the second state more quickly than a device made of a conventional semiconductor material. The relatively fast switching speed of the electronic components 223_1 to 223_6 may produce higher-order harmonics in the input currents ia, ib, and ic. The filter system 219 includes components (such as, for example, passive components such as capacitors and/or inductors) that attenuate or remove the higher-order harmonics.

The filter system 219 also may be used to control currents ia2, ib2, and ic2, which flow between the filter system 219 and the converter 220. In implementations in which the filter system 219 is used to control the currents ia2, ib2, and ic2, the electrical apparatus 210 also includes a current sensor 253 in each phase to measure ia2, ib2, and ic2, and a voltage sensor 251 to measure the voltage at the bus 218. The current sensors 253 and the voltage sensor 251 may be any kind of current and voltage sensors known in the art.

In these implementations, the control system 230_1 also implements a vector control technique for the converter 220. FIGS. 3A and 3B relate to an example of a vector control technique for the converter 222. FIG. 3A shows a two-phase dq reference system 380. FIG. 3B is a control diagram of a vector controller 370.

The three phase voltages ea, eb, and ec and the three phase currents ia2, ib2, and ic2 are converted by respective transformation modules 371_1 and 371_2 into an equivalent two-phase synchronous dq reference frame (FIG. 3A) that revolves at the system frequency (w) of the distribution network 201. The transformation modules 371_1 and 371_2 may implement, for example, a Clarke transformation and a Park transformation. The Clarke transformation converts the time domain components of a three-phase system (in the ABC frame) to two components in an orthogonal stationary frame ($\alpha\beta$). The Park transformation converts the two components in the $\alpha\beta$ frame to the orthogonal rotating reference frame (dq) using the angle $\theta$ from a phase-locked loop 379.

The dq components of the three phase currents ia2, ib2, ic2 are id, iq. The dq components of three phase voltages ea, eb, ec are Vd, Vq. The transformed current components id, iq and the transformed voltage components Vd, Vq are used as feedback variables for the controller 370. The iq component is used to control the reactive power. The id component is used to control the voltage Vdc at the bus 218. The control calculations are performed in the dq reference frame. The components of the three-phase current (id, iq) are controlled in an independent manner in two inner current control loops 372_1 and 372_2.

An outer loop 373 controls the voltage Vdc and seeks to maintain the voltage Vdc at or near a reference voltage Vdc*. The outer loop 373 sets the reference voltage Vdc*, which is the reference voltage or target voltage for the DC bus 218. The difference between the reference voltage Vdc* and the measured Vdc from the sensor 251 is determined at a comparator 375 and provided to a DC-link controller 374, which produces a reference d-axis current component id*. The difference between the transformed current value id (provided by the inner loop 372_1) and the reference d-axis current component id* is determined at a comparator 376 and provided to a proportional-integral (PI) controller 377. The PI controller 377 determines Vd*, which is a reference value for the d-axis voltage component.

In the inner loop 372_2, the transformed q-axis current component iq is multiplied by a cross coupling module 384, where $\omega$ is the system frequency of the distribution network 201 and L is the inductance of the filter inductor connected to the converter side. The cross-coupling component related to iq is also added to Vd* and Vd at a comparator 382, and the result is provided to the converter 220. In the inner loop 372_2, the difference between the component iq and a reference iq* is determined at a comparator 378 and provided to a PI controller 379, which determines a reference q-axis voltage Vq*. Vq*, Vq, and the cross-coupling component due to id are added at a comparator 381. The output of the comparators 381 and 382 are transformed back to the A, B, C frame of reference and provided to the converter 220 to drive the components 223_1 through 223_6.

In this way, the voltage Vdc at the bus 218 can be regulated to a constant level, and the currents ia, ib, is may be maintained as sinusoidal or nearly sinusoidal such that the total harmonic distortion (THD) is reduced. For example, for a 480 V three-phase input, the bus 218 may be maintained at 750 V in steady state. Additionally, by regulating the difference between the component iq and the reference iq*, the power factor may be maintained at unity or at a pre-determined value that is not equal to one. The power grid side power factor is the ratio of real power absorbed by 201 to the apparent power flowing in the electrical system 201. Power factor is a dimensionless quantity that has a value between 0 and 1. A power factor that is less than 1 indicates that the current and voltage are not in phase with each other. When the current and voltage are in phase with each other, the instantaneous power delivered to the load is maximized. A unity power factor (a power factor of 1) occurs when the current and voltage are in phase with each other and the greatest possible instantaneous power may be delivered to the converter 220.

The control system 230_2 implements a vector controller 380 for the inverter 240. FIG. 3C is a control diagram of an example vector controller 380 for the inverter 240. The vector controller 380 is distinct from the vector controller 370. The vector controller 380 has an outer speed loop and an inner current loop. The vector controller 380 obtains rotor speed and position information though estimation.

In the inner current loop, the currents ila, ilb, ilc that flow to each phase of the motor 202 are measured or estimated and are then transformed by a transformation module 399 into two-phase orthogonal components iα*, iβ* in the stationary α, β frame. The stationary α, β reference frame is shown in FIG. 3A. A transformation module 385 transforms the components iα*, iβ* into two-phase orthogonal components isd, isq in the rotating dq reference frame. The transformation module 399 may implement a Clarke transform, and the transformation module 385 may implement a Park transform. The d-component of the transformed current (isd) is compared to a reference isd* at a comparator 387, and the difference between isd and isd* is processed by a PI controller 389 to determine vsd*, which is a reference voltage for the d-axis voltage component.

In the outer speed loop, the rotation speed (ω) of the rotor and the position (θ) of the rotor are estimated by a speed and position estimation module 396. The speed and position estimation module 396 determines the speed (ω) and position (θ) of the rotor based on the d-axis and q-axis components of the voltage and current that are applied to the rotor. The determined speed (ω) of the rotor is compared to a reference speed (ω*) at a comparator 397. The difference between the determined speed (ω) and the reference speed (ω*) is provided to a speed controller module 398, which determines a reference q-axis current (isq*) based on the difference.

The q-component of the transformed current (isq) is compared to the reference isq* at a comparator 386, and the result is processed by a PI controller 388 to determine vsq*, which is a reference voltage for the q-axis voltage component. The values vsq* and vsd* are provided to a transformation module 395, which converts the values vsq* and vsd* into voltage components vα, vβ in the stationary α, β reference frame. The stationary α, β reference frame is shown in FIG. 3A. The transformation module 395 may implement an inverse Park transform. The components vα, vβ are the components of the stator voltage vector and are the inputs for a modulation module 390. The modulation module 390 generates a three-phase voltage command signal va*, vb*, vc* from the transformed voltages vα* and vβ* using a space vector pulse width modulation (SVPWM) technique. The modulation module 390 and the transformation module 395 may be implemented as a software module. For example, the electronic storage 234_2 may include instructions that, when executed by the electronic processing module 232_2, perform the processing discussed above.

The three-phase voltage command signal va*, vb*, vc* is provided to the inverter 240. The inverter 240 generates the motor power signal 204 based on the three-phase voltage command signal va*, vb*, vc*. For example, the switching elements 243_1 to 243_6 may receive a direct-current (DC) voltage from a DC power source 391 (for example, a battery, DC power supply, or other source of DC power). The inverter 240 generates a pulse width modulated (PWM) signal for each of the three phases by applying signals based on the three-phase voltage command signal to the various switching elements 243_1 to 243_6. The DC voltage provided by the DC power source 391 is converted to pulse width modulated three-phase AC voltage signals having particular characteristics by the controlled switching operations of the switching elements 243_1 to 243_6. Thus, the SVPWM module 390 determines the voltages to apply to the electronic components 243_1 to 243_6 of the inverter 240 to produce the motor power signal 204 with certain characteristics. Other implementations of the vector controller 380 may be used.

FIGS. 4A and 4B are schematics of filter systems 419A and 419B, respectively. Either of the filter systems 419A or 419B may be used as the filter system 219 in the electrical apparatus 210 (FIG. 2). The filter system 419A includes two inductors 461_1 and 461_2, and a shunt capacitor 462 between the inductors 461_1 and 461_2 for each phase of the electrical distribution network 201 (FIG. 2). For simplicity, only one phase is labeled in FIG. 4A. The filter system 419B does not include a capacitor and instead only includes an inductor 463 in series with the respective module 225_1, 225_2, 225_3. The inductors 461_1, 461_2, and 463 may be, for example, metal cores with copper coils.

The filter system 419A is referred to as an LCL filter. The filter system 419B is referred to as an L filter. Both of the filter systems 419A and 419B attenuate high-frequency noise generated by the switching of the WBG semiconductor electronic elements 223_1 to 223_6. The filter systems 419A and 419B reduce or prevent high-frequency noise generated by the converter 220 from entering the distribution network 201. The filter system 419A may provide better attenuation of the noise than the filter system 419B. On the other hand, the filter system 419B is simpler and less costly to implement and also provides attenuation of high-frequency noise. Inductors 461_2 in FIGS. 4A and 463 in FIG. 4B are also used to boost the DC bus 218 voltage (Vdc) to its target value through the vector controller 370 shown in FIG. 3B.

Referring again to FIG. 2, other topologies may be used for the filter system 219 (FIG. 2). For example, in some implementations, the filter system 219 is an LC filter that includes a single inductor and a shunt capacitor for each phase of the distribution network 201. Moreover, the filter system 219 may be provided separately from the electrical apparatus 210.

Although the electrical apparatus 210 is shown in FIG. 2 with the distribution network 201 and the motor 202, the electrical apparatus 210 may be packaged without the distribution network 201 or the motor 202. In other words, the electrical apparatus 210 is a stand-alone device. Moreover, the electrical apparatus 210 may or may not include the control system 230. Furthermore, the converter 220 may be packaged separately and used with inverters other than the inverter 240.

The electrical apparatus 210 implements a hybrid approach that uses the WBG semiconductor electronic components 223_1 to 223_6 in the converter 220 and the conventional semiconductor electronic components 243_1 to 243_6 in the inverter 240. This topology achieves various performance improvements, as discussed below.

In a traditional three-phase two-level converter, six diodes made of a conventional semiconductor (for example, Si) are arranged to form a rectifier. The uncontrolled action of the diodes produces input current harmonics that are transferred to the distribution network 201. For example, a traditional converter that includes six diodes made of a conventional semiconductor material may have a THD of 30% or higher. On the other hand, an AFE (such as the converter 220) includes components that are controlled such that the input currents ia, ib, is remain sinusoidal or nearly sinusoidal. An AFE generates much less harmonic distortion. For example, the converter 220 may have a harmonic distortion of 5% or less. Additionally, the power factor of an AFE is also controllable through a vector control technique, as discussed above.

Furthermore, an AFE provides bi-directional or regenerative power flow, meaning that electrical power can flow from the electrical distribution system 201 to the motor 202 or from the motor 202 to the electrical distribution system 201. Examples of regenerative applications (applications that generate energy) include machines that lift and lower, such as: elevators, hoists, cranes, and escalators. Additional examples include torque-controlled applications like tension unwinders, web handling systems, and test stands. Still other examples of regenerative applications include cyclic applications such as centrifuges in oil and gas extraction and production. In regenerative applications, energy is delivered from the motor 202 to the electrical distribution system 201.

In a "monitoring mode," energy is delivered to the electrical apparatus 210, current flows into the electrical apparatus 210 and is output to the motor 202. The motor 202 converts the electrical energy into mechanical energy, which is used to perform work, such as, for example, lifting a large object. When the object is lowered or the motor speed is reduced, the motor 202 acts like a generator ("generating mode") and the potential energy of the system is converted into electrical current which flows back into the electrical apparatus 210. If the electrical apparatus 210 was implemented as an uncontrolled rectifier (for example, with six Si diodes), current would be able to flow back across the inverter 240 to the capacitor network 217 but would not be able to go further due to the uncontrolled rectifier stage. In this scenario, the DC bus voltage would continue to rise until the VFD faults out with an overvoltage error. The traditional solution is to add braking DC link resistor banks for dissipating the regenerative energy. The DC link resistor banks create heat, increase weight, volume, and cost. However, the converter 220, which includes the controllable WBG semiconductor components such as SiC MOSFETs, allows the electrical energy produced by the motor 202 to flow back into the distribution network 201. Thus, the use of the controllable WBG semiconductor components in the converter 220 eliminates the need for the resistor banks and allows the regenerated energy to be recaptured.

The electrical apparatus 210 realizes additional performance enhancements. The use of the WBG semiconductor electronic components in the converter 220 results in the electrical apparatus 210 being smaller overall, more efficient, lighter weight, and/or less costly than if the converter 220 was implemented with electronic components made of a conventional semiconductor material.

Furthermore, the use of electronic components made of conventional semiconductor material in the inverter 240 allows the electrical apparatus 210 to be used with many different motors and loads that are already configured to work with inverters that include electronic components made of a conventional semiconductor material. Moreover, due to the much quicker switching times of electronic components made of a WBG semiconductor material, using WBG semiconductor components in the inverter 240 would exacerbate known challenges in existing variable frequency drives, VFDs, and ASDs.

Figure 5B:
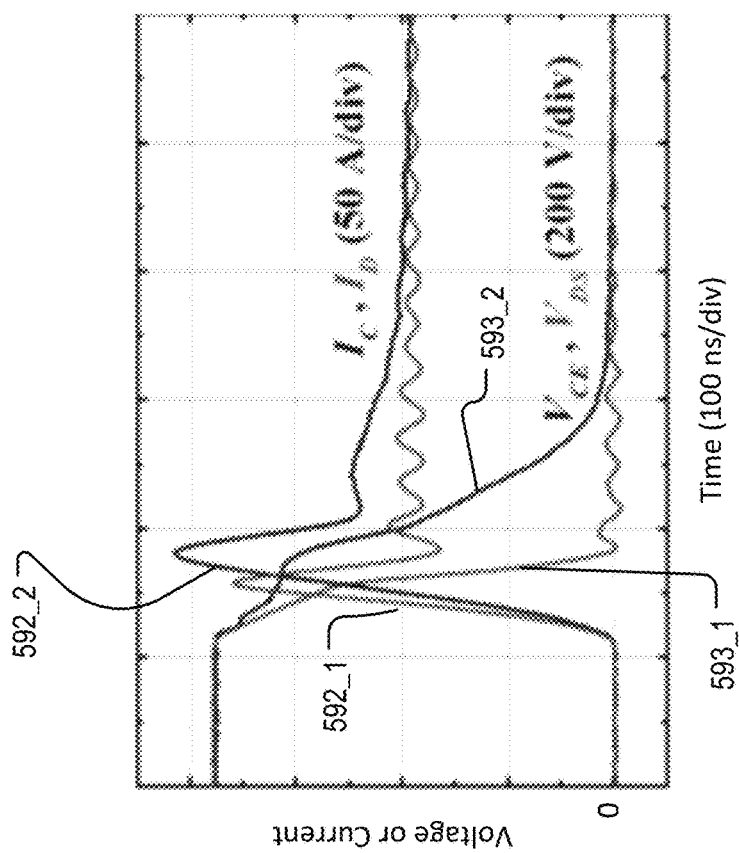
FIG. 5B shows turn-off waveforms for a Si IGBT and a SiC MOSFET.
Figure 5A:
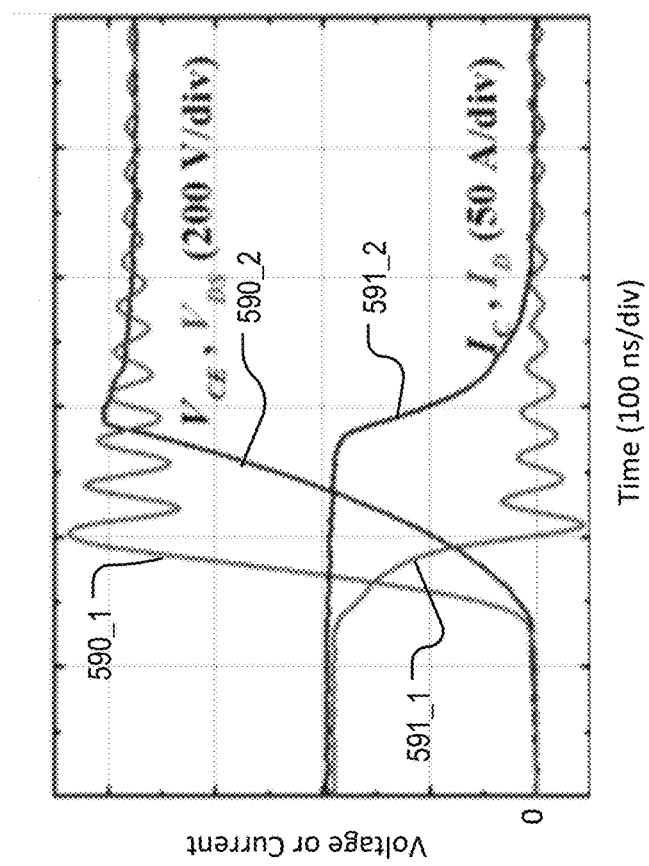
FIG. 5A shows turn-on waveforms for a Si IGBT and a SiC MOSFET.

FIGS. 5A and 5B illustrate the difference in switching times. FIG. 5A provides a comparison of turn-on waveforms for a Si IGBT and a SiC MOSFET. FIG. 5B provides a comparison of turn-off waveforms for a Si IGBT and a SiC MOSFET. The x-axis in FIG. 5A and FIG. 5B is the same and is time in units of 100 nanoseconds per division.

Referring to FIG. 5A, a plot 590_1 shows voltage as a function of time for a SiC MOSFET, a plot 590_2 shows voltage as a function of time for a Si IGBT, a plot 591_1 shows current as a function of time for the SiC MOSFET, and a plot 591_2 shows current as a function of time for the Si IGBT. The SiC MOSFET transitions to the on state much more quickly than does the Si IGBT. Referring to FIG. 5B, a plot 592_1 shows current as a function of time for the SiC MOSFET, a plot 592_2 shows current as a function of time for the Si IGBT, a plot 593_1 shows voltage as a function of time for the SiC MOSFET, and a plot 593_2 shows voltage as a function of time for the Si IGBT. The SiC MOSFET turns on and off more quickly than the Si IGBT.

The switching time for a WBG semiconductor electronic component is faster than the switching time for an electronic component made of a conventional semiconductor material. The more rapid switching time for the WBG semiconductor electronic components makes them less attractive for use in the inverter 240, for reasons discussed below.

The impedance of the motor 202 is different than the impedance of the cable 207. When the pulses in the motor power signal 204 reach the motor 202, a portion of the pulse reflects off the impedance mismatch and propagates back toward the inverter 240. The reflected pulse adds to subsequently occurring pulses in the motor power signal 204, resulting in a pulse with a larger-than-expected voltage eventually arriving at the motor 202 and causing an overvoltage situation.

The amplitude of the reflected pulse increases as the length of the cable 207 increases. The switching time (or rise time) of the electronic components used in the inverter 240 also has an effect on the reflected pulse and the amount of over-voltage. If the turn-on time of the electronic components 243_1 to 243_6 in the inverter 240 is relatively slow, the capacitance in the motor 202 has time to charge and discharge at roughly the same rate as the pulses in the motor power signal 204 are generated. However, if the turn-on time of the electronic components 223_1 to 223_6 is relatively fast, the capacitance in the motor 202 does not have time to charge and discharge before the next pulse in the motor power signal 204 is applied to the motor 202. As a result, if electronic components with a relatively fast switching time (such as WBG electronic components) are used in the inverter 240, the energy stored in the motor 202 increases over time as the motor power signal 204 is applied to the motor 202 and there is an increased over-voltage at the motor 202. Thus, using WBG electronic components (which may be driven at higher switching speeds than electronic components made of a conventional semiconductor material) in the inverter 240 instead of the components 243_1 to 243_6 (which are made of conventional semiconductor material) may make over-voltage occurrences more severe.

Furthermore, if WBG electronic components were used in the inverter 240 instead of the conventional semiconductor electronic switches 243_1 to 243_6, there would be a higher probability of the motor 202 failing due to bearing currents. Parasitic capacitance between the stator and the rotor of the motor 202 may induce a voltage on the rotor. If the voltage increases to a sufficient level, the voltage may discharge to ground through the bearings of the motor 202. The induced voltage on the rotor grows more easily if the time over which the voltage changes is reduced. In other words, induced voltage on the rotor increases as the frequency of the motor power signal 204 increases. Thus, if the switching elements in the inverter 240 are driven at relatively high speeds (such as would be possible with electrical components made of WBG materials), the motor 202 would be more likely to be damaged or fail due to bearing currents.

Accordingly, although in some respects electronic components made of WBG semiconductor materials have superior performance as compared to electronic components made of a conventional semiconductor material, the use of the electronic components 243_1 to 243_6 (which are made of a conventional semiconductor material) in the inverter 240 results in a more robust and economical electrical apparatus 210.

Using the electronic components 223_1 to 223_6 (which are made of a WBG semiconductor material) in the converter 220 also results in improvements to the electrical apparatus 210. For example, using the electronic components 223_1 to 223_6 in the converter 220 increases the overall efficiency of the electrical apparatus 210 due to the WBG electronic components having much lower losses than electronic components made of a conventional semiconductor material. The use of WBG electronic components in the converter 220 also increases the power density due to the higher temperature withstand of WBG electronic components. Furthermore, the use of WBG electronic components in the converter reduces the overall size of the electrical apparatus 210, which includes the inductors 461_1, 462_2 in FIG. 4A or 463 FIG. 4B.

Figure 6B:
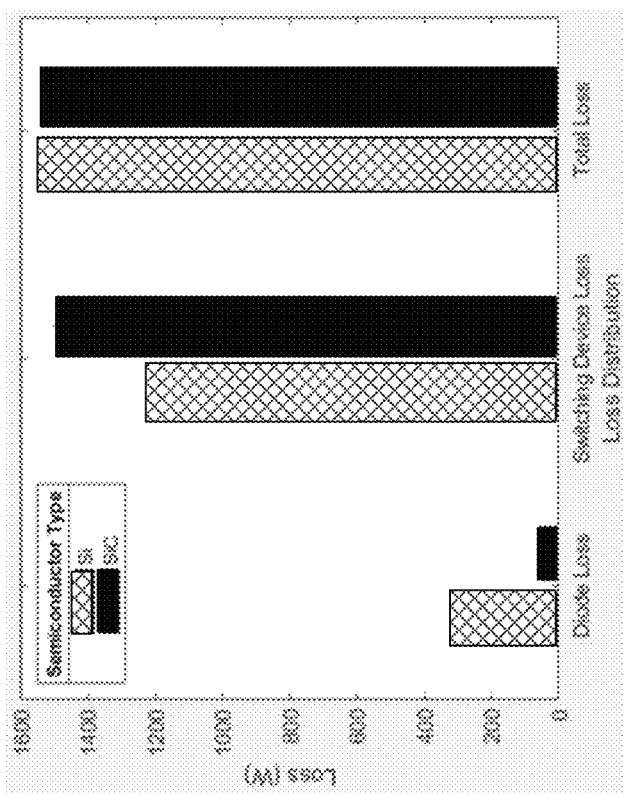
FIG. 6B is another bar chart that compares the losses of a Si IGBT and a SiC MOSFET.
Figure 6A:
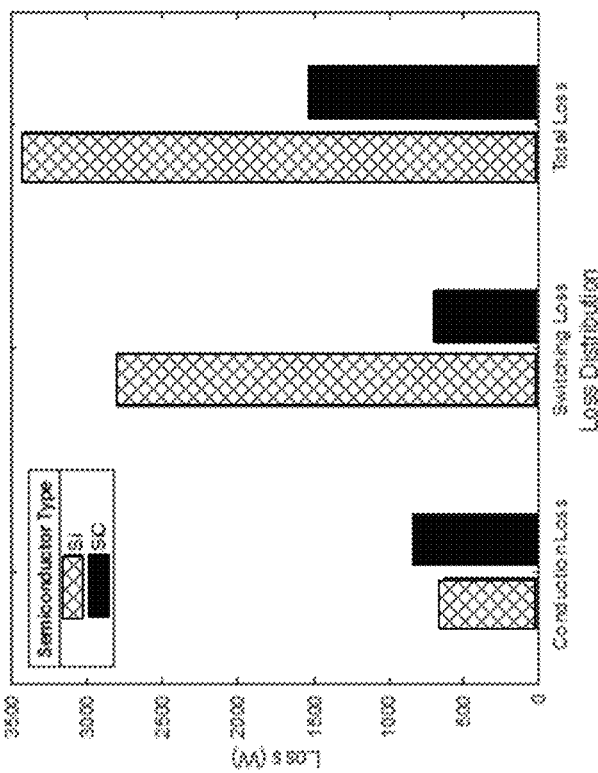
FIG. 6A is a bar chart that compares the losses of a Si IGBT and a SiC MOSFET.

FIG. 6A is a bar chart that compares the losses of a Si IGBT (cross hatching patterned bars) and a SiC MOSFET (solid bars) at a switching rate of 20 kHz. The bar chart of FIG. 6A shows conduction loss, switching loss, and total loss in units of Watts (W). Conduction loss is the loss that occurs when the transistor is on. Switching loss is the loss that occurs when the transistor is off. The total loss is the sum of the conduction loss and the switching loss. As shown in FIG. 6A, the total loss for the SiC MOSFET is less than half the total loss of the Si IGBT. Thus, an converter made with the SiC MOSFET may be much smaller (for example, half of the size) of an converter made with the Si IGBT. The size reduction is due to the SiC MOSFET generating less heat at the same switching frequency. Because less heat is generated, heat management components (such as heat sinks) may be made much smaller in a converter (such as the converter 220) that uses WBG semiconductor components. Thus, the converter 220, which is implemented with WBG semiconductor electronic components, is able to deliver the same amount of power but is smaller, and therefore has a higher power density.

FIG. 6B is a bar chart that compares the losses of a Si IGBT (cross hatching patterned bars) and a SiC MOSFET (solid bars) in a scenario in which the Si IGBT was switched at its optimal and most efficient switching frequency (about 7 kHz) and the SiC MOSFET was switched at its optimum switching frequency (about 50 kHz). FIG. 6B shows conduction loss, switching loss, and total loss in units of W. As shown in FIG. 6B, the total loss is similar for the SiC MOSFET and the Si IGBT even though the Si IGBT was driven at its optimal frequency. Accordingly, a converter made with the SiC MOSFET and a converter made with the Si IGBT may be made the same size; however, the inverter made with the SiC MOSFET may be switched at a much higher frequency.

The ability of the converter to be switched at a higher frequency allows an overall size reduction of the electrical apparatus 210. The impedance of an ideal inductor is given as jωL, where ω is the frequency and L is the amount of inductance. In other words, the impedance of an ideal inductor is proportional to the frequency and the inductance of the inductor. Thus, for a filter that includes an inductor, such as the filter 419A or the filter 419B, the inductance required to attenuate unwanted frequencies decreases as the frequency to be attenuated increases. Accordingly, because the switching frequency is higher for WBG semiconductor electronic components, the inductor in the filter may be made smaller for when the converter is implemented with WBG electronic components (such as the converter 220). This reduction in inductor size results in an overall reduction in the size, weight, and cost of the electrical apparatus 210, even though the converter 220 is substantially the same size as a converter made with electrical components made of a conventional semiconductor material.

Figure 6C:
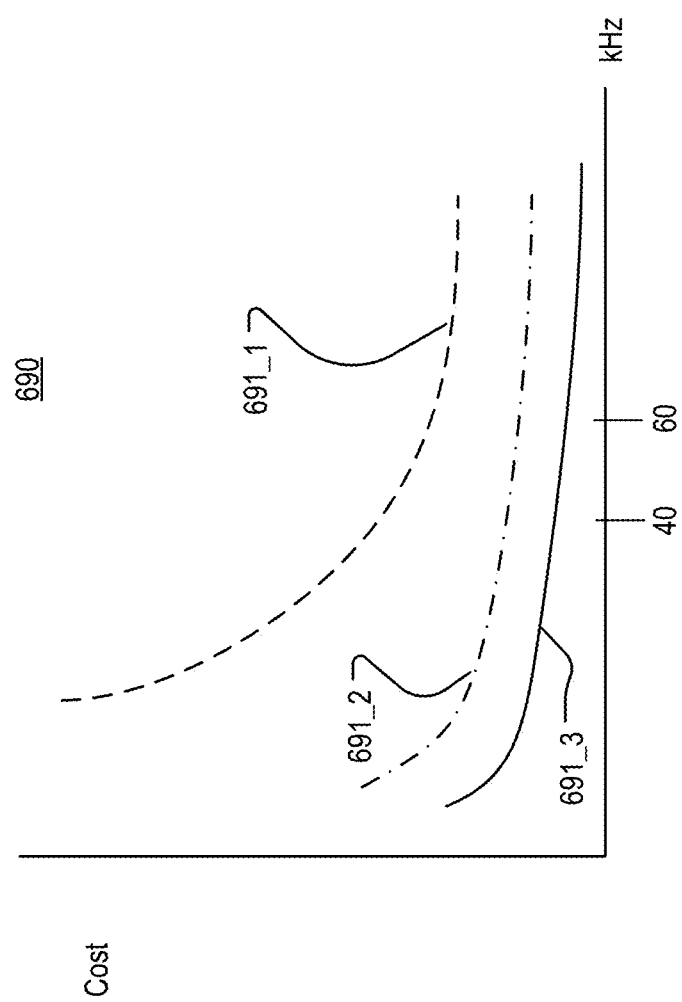
FIG. 6C is an illustration of approximate trends of relative inductor cost as a function of switching frequency.

Moreover, the cost of the inductors used in the filter 419A or 419B is also generally lower when the switching frequency in the inverter 240 is higher. FIG. 6C shows an illustration 690 of approximate trends of relative inductor cost as a function of switching frequency. The illustration 690 includes curves 691_1, 691_2, and 691_3, each of which corresponds to a different target ripple current. The ripple is the amount of switching noise that is not damped by the inductor in a filter such as the filter 419A or 419B. The ripple current is expressed as a percentage of the peak current. The curve 691_1 corresponds to a relatively high ripple (for example, 50%), the curve 691_3 corresponds to a relatively low ripple (for example, 5%), and the curve 691_2 corresponds to a ripple between the relatively high ripple and the relatively low ripple. At a given frequency, inductor size increases as the target ripple decreases. However, and as discussed above, a smaller inductor may be used as the w increases. Thus, as shown in FIG. 6C, the cost of the inductor generally decreases with frequency. Accordingly, the use of the WBG semiconductor components 223_1 to 223_6 in the converter 220 realizes a cost savings because lower cost inductors may be used. Moreover, the cost of the WBG semiconductor components and their associated driving electronics and controls are generally greater than the cost of components made with a conventional semiconductor material. However, the cost savings from using smaller inductors, and reduced thermal and packaging requirements may balance out the additional cost of using the WBG electronic components 223_1 to 223_6 in the converter 220.

Figure 7B:
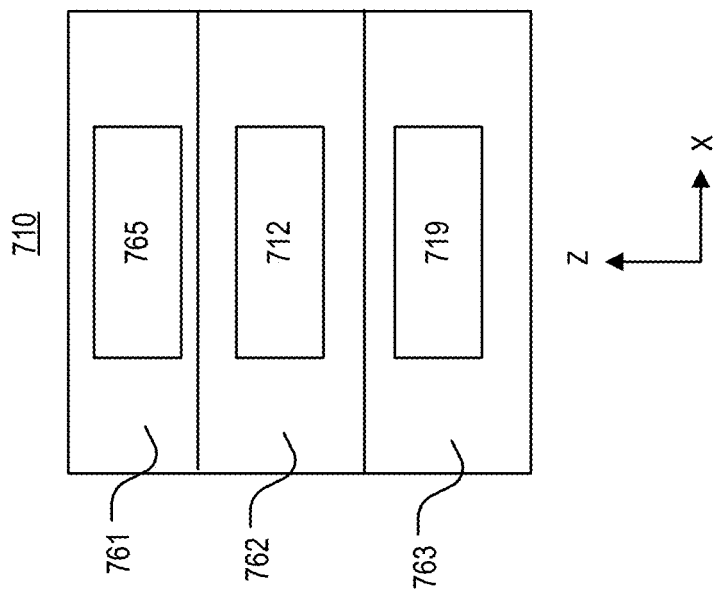
FIGS. 7A and 7B are, respectively perspective and side block diagrams of an electrical apparatus.
Figure 7A:
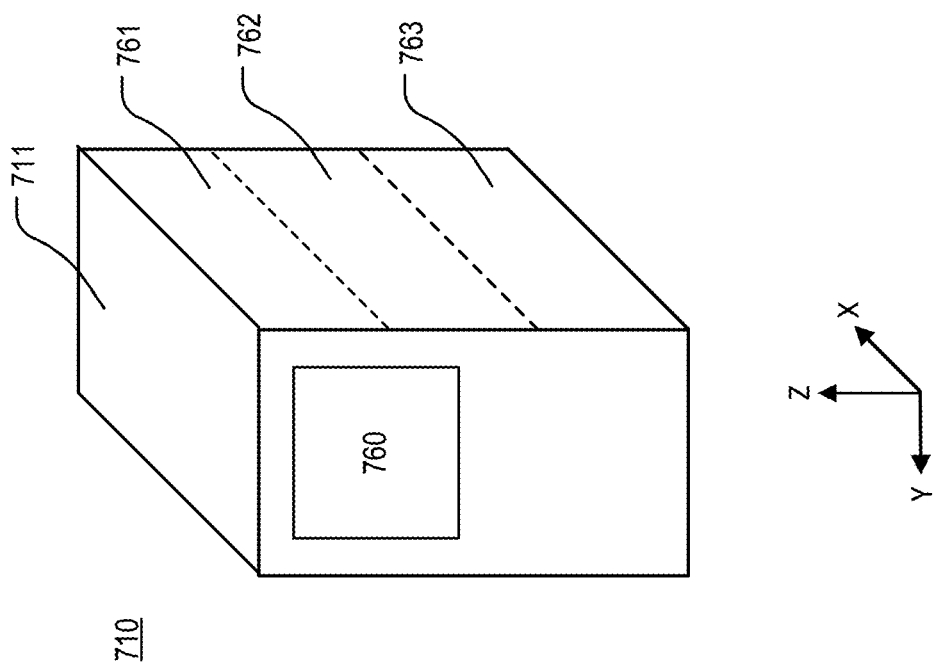

Referring to FIGS. 7A and 7B, perspective and side block diagrams of an electrical apparatus 710 are shown. The electrical apparatus 710 is another implementation of the electrical apparatus 110 (FIG. 1). The electrical apparatus 710 includes an electrical network 712. The electrical network 712 includes a converter that uses WBG semiconductor electronic components and an inverter that uses conventional semiconductor electronic components. This allows the electrical apparatus 712 to have a smaller volume than an apparatus that does not include such a hybrid electrical network.

The electrical apparatus 710 includes a housing 711. The housing 711 is a three-dimensional structure. The housing 711 may be made of any rugged and durable material. The housing 711 is shown as a cuboid but may have any three-dimensional shape.

The electrical apparatus 710 includes three regions 761, 762, and 763. The regions are within the housing 711 and are shown in FIG. 7A with dotted lines. In the example of FIGS. 7A and 7B, the regions are stacked along the Z direction. However, other configurations are possible. For example, the regions 761, 762, and 763 may be stacked along the X direction. The regions are sections of space within the housing 711. The regions 761, 762, and 763 are not necessarily separate physical compartments and the interior of the housing 711 may or may not be physically divided. Moreover, the regions 761, 762, and 763 may have different relative volumes than the relative volumes illustrated in FIGS. 7A and 7B.

The region 761 includes an electronics system 765. The electronics system 765 includes various electronic and mechanical components that are associated with a user interface 760. The user interface 760 may include, for example, a touch screen, keypad, knobs, dials, switches, and/or any other device that allows an operator to interface with the electrical apparatus 710.

The region 762 includes the electrical network 712. The region 763 includes a filter system 719. The electrical network 712 includes a converter with WBG semiconductor electronic components, such as SiC transistors, arranged to form a rectifier. The filter system 719 is electrically connected to the rectifier. The WBG semiconductor electronic components take up less space than conventional semiconductor devices arranged to form a rectifier. Furthermore, the filter system 719 takes up a smaller volume than a similar filter that would be used with a converter that includes electronic components made of conventional semiconductor material. For the example, the filter system 719 may be an LCL filter (such as shown in FIG. 4A), but the electrical network 712 with the WBG-based converter allows the inductors used for the LCL filter to be smaller than would otherwise be the case. Thus, the filter system 719 is also smaller. In another example, the filter system 719 may include one inductor per phase of the converter. This approach also results in space savings.

Thus, due to the hybrid configuration of the electrical network 712, the volume of the electrical apparatus 710 is reduced. Furthermore, the electrical network 712 experiences lower electrical losses and is thus more efficient than an electrical network that includes a converter configured with components made of conventional semiconductor.

Figure 8:
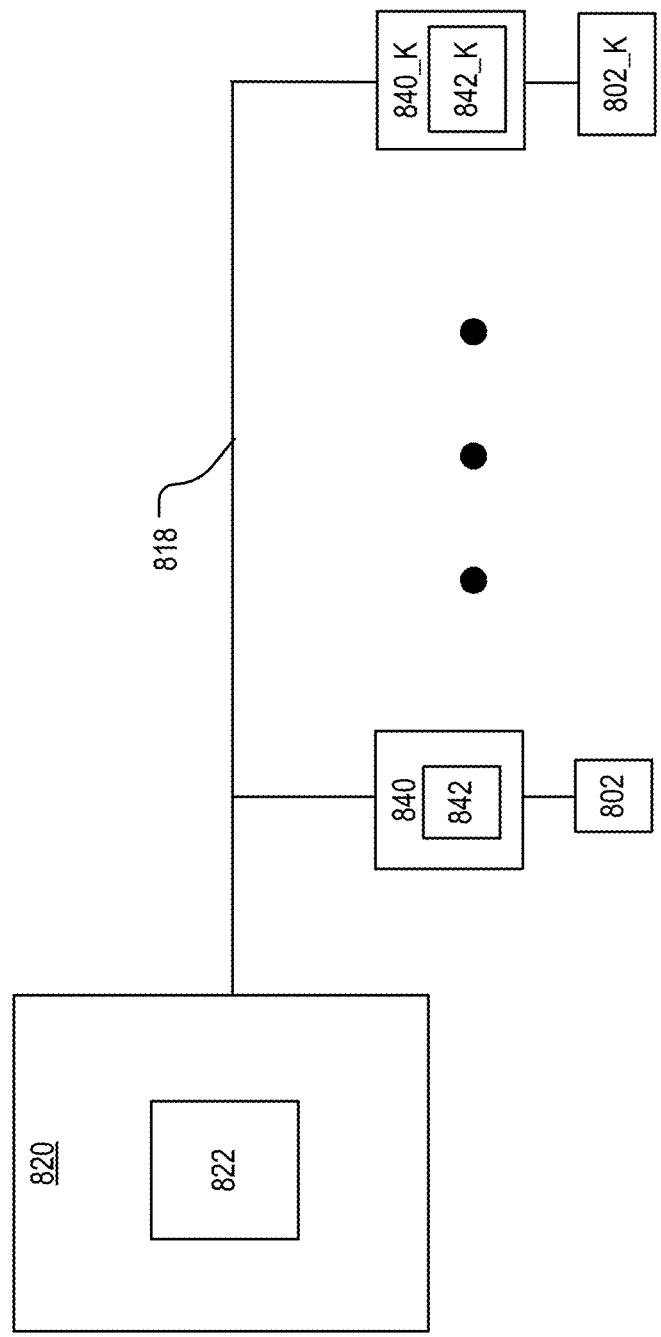
FIG. 8 is a block diagram of a converter electrically connected to a plurality of inverters.

Referring to FIG. 8, a converter 820 is electrically connected to a bus 818. The converter 820 includes an electrical network 822 that converts AC electrical power (for example, from a distribution system such as the distribution network 201) to DC electrical power. The converter 820 provides the DC electrical power to the bus 818. The electrical network 822 includes a plurality of WBG semiconductor electrical components, such as, for example, SiC transistors. The WBG semiconductor electrical components may be arranged in any manner that is capable of producing the DC electrical power. For example, the WBG semiconductor electrical components may be arranged as a 2-level or 3-level rectifier.

The bus 818 is electrically connected to K inverters, where K is any integer number that is equal to or greater than 1. The K inverters are labeled as 840 . . . 840_K. Each of the inverters 840 . . . 840_K is an instance of the inverter 240 or an inverter that is similar to the inverter 240 (FIG. 2). Each of the inverters 840 . . . 840_K includes a respective electrical network 842 . . . 842_K. Each electrical network 842 . . . 842_K includes a plurality of conventional semiconductor electronic components, such as Si transistors. Each of the inverters 840 . . . 840_K converts DC electrical power in the bus 818 into a motor power signal for a respective motor 802 . . . 802_K (each of which may be a motor such as the motor 202).

Other implementations are within the scope of the claims. For example, the electrical apparatuses 210 shown in FIG. 2 is for use with the three-phase distribution system 201 and the three-phase motor 202. However, other implementations are possible. For example, the electrical apparatus 210 may be configured to work with more or fewer phases.

What is claimed is:

1. A motor driver apparatus comprising:
   a converter comprising a first electrical network configured to convert AC electrical power into DC electrical power, wherein the first electrical network comprises a plurality of controllable electrical elements, wherein each of the controllable electrical elements is made of a wide bandgap semiconductor material and is configured to be placed in one of a plurality of states by a control signal; and
   an inverter electrically connected to the converter, the inverter comprising a second electrical network configured to generate an AC motor power signal from the DC electrical power, wherein the second electrical network comprises a plurality of electronic elements that comprise a semiconductor material that is not a wide bandgap semiconductor material.

2. The motor driver apparatus of claim 1, further comprising a control system configured to produce the control signal to thereby control the state of each controllable electronic element in the first electrical network.

3. The motor driver apparatus of claim 2, further comprising a filter system electrically connected to the converter.

4. The motor driver apparatus of claim 3, wherein the filter system receives AC electrical power and provides filtered AC electrical power to the converter such that the converter is configured to convert the filtered AC electrical power to the DC electrical power.

5. The motor driver apparatus of claim 2, wherein the control system is further configured to control the electronic elements in the second electrical network.

6. The motor driver apparatus of claim 5, wherein the control system is configured to control the electronic elements in the second electrical network to implement pulse width modulation of the DC electrical power.

7. The motor driver apparatus of claim 1, further comprising a bus electrically connected to the converter and the inverter, and wherein the bus comprises at least one capacitive element.

8. The motor driver apparatus of claim 1, wherein the first electrical network is configured as an M-level converter, and the second electrical network is configured as an N-level converter, wherein each of M and N is an integer value of two or greater.

9. The motor driver apparatus of claim 8, wherein M and N are the same integer value.

10. The motor driver apparatus of claim 9, wherein M and N are not the same integer value.

11. The motor driver apparatus of claim 1, wherein the wide bandgap semiconductor material comprises silicon carbide (SiC) or gallium nitride (GaN), and the semiconductor material that is not a wide bandgap semiconductor material comprises silicon (Si) or gallium arsenide (GaAs).

12. The motor driver apparatus of claim 1, wherein the semiconductor material that is not a wide bandgap semiconductor material comprises any semiconductor material that has a bandgap of about 1-1.5 electronvolts (eV) at 300 Kelvin (K), and the wide bandgap semiconductor material comprises any semiconductor material that has a bandgap of about 2-4 eV at 300 K.

13. The motor driver apparatus of claim 1, wherein each of the controllable electronic elements in the first electrical network comprises a transistor, and each of the electronic elements in the second electrical network comprises a transistor.

14. An apparatus comprising:
a converter comprising a first electrical network configured to generate DC electrical power from AC electrical power, the first electrical network comprising a plurality of controllable electronic elements, wherein each of the plurality of controllable electronic elements is made of a wide bandgap semiconductor material and is configured to be placed in one of a plurality of states by a control signal; and
a DC link electrically connected to the converter, the DC link configured to store DC electrical power from the converter and to provide DC electrical power to a plurality of inverters, wherein each of the plurality of inverters comprises a second electrical network configured to generate an alternating current (AC) motor power signal, and wherein each of the second electrical networks comprise electronic elements that are made of a semiconductor material that is not a wide bandgap semiconductor material.

15. The apparatus of claim 14, further comprising a filter system electrically connected to the converter, wherein the converter is between the filter system and the DC link.

16. A system comprising:
a motor driver apparatus comprising:
a converter comprising a first electrical network, the first electrical network comprising at least one controllable electronic element made of a wide bandgap semiconductor material, the controllable electronic element being configured to be placed in one of a plurality of states by a control signal;
a bus electrically connected to the converter; and
an inverter electrically connected to the bus, the inverter comprising a second electrical network configured to generate an alternating current (AC) motor power signal, wherein the second electrical network comprises electronic elements that are made of a semiconductor material that is not a wide bandgap semiconductor material; and
a motor configured to receive the AC motor power signal, wherein one or more of a speed, torque and direction of a rotor of the motor is determined by the AC motor power signal.

17. The system of claim 16, further comprising a housing that encloses the motor driver apparatus.

18. The system of claim 16, further comprising a filter system electrically connected to the converter.

19. The system of claim 18, further comprising a cable configured to communicate the AC motor power signal to the motor in an industrial application.

20. The system of claim 19, wherein the cable is at least 10 meters long.

21. A motor driver apparatus comprising:
a converter comprising a first electrical network configured to convert AC electrical power into DC electrical power, wherein the first electrical network comprises at least one electronic element that comprises a wide bandgap semiconductor material; and
an inverter electrically connected to the converter, the inverter comprising a second electrical network configured to generate an AC motor power signal from the DC electrical power, wherein the second electrical network comprises a plurality of electronic elements that comprise a semiconductor material that is not a wide bandgap semiconductor material, wherein
the semiconductor material that is not a wide bandgap semiconductor material comprises any semiconductor material that has a bandgap of about 1-1.5 electronvolts (eV) at 300 Kelvin (K), and the wide bandgap semiconductor material comprises any semiconductor material that has a bandgap of about 2-4 eV at 300 K.

22. The motor driver apparatus of claim 21, further comprising:
a filter system electrically connected to the converter; and
a control system configured to control a state of the electronic elements in the first electrical network and a state of the electronic elements in the second electrical network.

* * * * *